(12) United States Patent
Ueyama (10) Patent No.: US 7,353,693 B2
(45) Date of Patent: Apr. 8, 2008

(54) EVALUATION APPARATUS FOR SCIENTIFIC PHENOMENA AND EVALUATION METHOD FOR SCIENTIFIC PHENOMENA USING THE SAME

(75) Inventor: Tomohide Ueyama, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 300 days.

(21) Appl. No.: 11/215,042

(22) Filed: Aug. 31, 2005

(65) Prior Publication Data
US 2006/0042360 A1    Mar. 2, 2006

(30) Foreign Application Priority Data
Aug. 31, 2004   (JP)   .............. 2004-252346

(51) Int. Cl.
*G01N 11/00*  (2006.01)
*G09B 23/12*  (2006.01)

(52) U.S. Cl. .............. 73/53.01; 73/54.11; 434/126; 434/276; 434/370

(58) Field of Classification Search .............. 73/53.01, 73/54.11; 434/126, 276, 370
See application file for complete search history.

(56) References Cited

U.S. PATENT DOCUMENTS

| | | |
|---|---|---|
| 4,034,493 A | 7/1977 | Ball |
| 5,242,307 A | 9/1993 | Reinbold |
| 5,885,470 A * | 3/1999 | Parce et al. .............. 216/33 |
| 6,254,396 B1 | 7/2001 | Stevens |

FOREIGN PATENT DOCUMENTS

| | | |
|---|---|---|
| DE | 200 05 052 U1 | 8/2000 |
| JP | 2000-242162 A | 9/2000 |

\* cited by examiner

*Primary Examiner*—Daniel S. Larkin
(74) *Attorney, Agent, or Firm*—Sughrue Mion, PLLC (57) ABSTRACT

In the evaluation apparatus of the present invention, there are formed a plurality of minute channels having a cross-sectional area of not more than 1 $mm^2$, one end of each of these channels joins in at a single meeting point and, when liquids are put into one or more of the liquid reservoirs in a higher position over any other liquid reservoir, the liquids flow down in the channels by gravity. Therefore, a scientific phenomenon, such as the diffusion of molecules, can be qualitatively observed. Furthermore, the apparatus provides a sufficient level of accuracy to enable the user to watch various phenomena involved in advanced technology, and uses no large quantity of chemicals or the like, which means little load on the environment.

16 Claims, 6 Drawing Sheets

EVALUATION APPARATUS FOR SCIENTIFIC PHENOMENA AND EVALUATION METHOD FOR SCIENTIFIC PHENOMENA USING THE SAME

BACKGROUND OF THE INVENTION

1. Field of the Invention

The present invention relates to an evaluation apparatus for scientific phenomena and an evaluation method for scientific phenomena using the apparatus, and more particularly to an evaluation apparatus for scientific phenomena which is inexpensive, imposes little load on the environment and is suitable for enabling its user to find fun in advanced technology, and an evaluation method for scientific phenomena using such an apparatus.

2. Related Art

Many configurations have already been proposed for evaluation apparatuses for scientific phenomena and teaching aids for experiments in science education (see Japanese Patent Application Laid-Open No. 2000-242162).

For instance, Japanese Patent Application Laid-Open No. 2000-242162 discloses a teaching aid for science education which enables natural phenomena involving water caused by temperature variations to be readily observed by cooling or freezing vapor in the atmosphere or water or vapor contained in a vessel. It is claimed to be compact and simply structured, and yet able to faithfully reproduce natural phenomena involving water caused by temperature variations.

Commercially available chemical experiment apparatuses for educational use include experiment kits, such as "Science and Learning: Experiment Kit Series" and "Science for Adults: Kit for Global Environment Analysis" marketed by Gakushu Kenkyu Sha and others. They are available at relatively low prices, a few hundred yen to at most around 3,000 yen per kit. They are well accepted as being able to give dreams to children or help their users experience the fun of experiments.

However, some of the conventional evaluation apparatus for scientific phenomena, including what is disclosed in Japanese Patent Application Laid Open No. 2000-242162, are relatively complex in structure and therefore difficult to be offered at low prices, too expensive for every pupil of a class to buy one.

On the other hand, experiment kits relatively simple in structure are lower in price, low enough for every pupil of a class to have one, but many of them are not adequate in finish accuracy, and consume correspondingly larger volumes of expendables, such as chemicals. Therefore, if every pupil of a class uses such a kit, the disposal of the waste liquid, for instance, would impose a heavy load on the environment, which is an obvious disadvantage.

Moreover, scientific experiments that can be experienced with conventional kits are mostly classical ones, but kits that enable the users to enjoy the fun of advanced technology are extremely limited in variety.

In view of these circumstances, the present inventors have thought that a promising evaluation apparatus for scientific phenomena which would permit ready access to the joy of advanced technology, which is inexpensive and imposes little load on the environment, consists of a substrate of a planar shape in whose surface long grooves of very small sectional area are formed, and a cover plate which is disposed on the surface of this substrate in close contact with it and enables the long grooves to form minute channels in the substrate by covering it. This configuration would allow the user to visually recognize the scientific phenomenon taking place in the channel.

SUMMARY OF THE INVENTION

However, this evaluation apparatus has its own problem that some contrivance is needed to make liquid flow in the channel. Thus, while the usual way to feed liquid is to apply a positive or negative pressure with a pump or the like, and such a device is capable of highly accurate operation for a long period, but a pump or the like is large and expensive, therefore unsuitable as a teaching aid for classroom use, which every member of the class should be able to buy one.

On the other hand, a syringe or the like could be used as an inexpensive and simple pump device, but the performance of feeding liquid into a minute channel with such a tool might differ from one individual to another, making it unsuitable as a constituent item of an experiment kit. Thus, when a syringe is used, the force applied to it may considerably vary, resulting in large differences in flow rate and a lack of consistency in fed quantity.

An alternative method of liquid feeding utilizes a volume variation of gas by heating or cooling, and this would entail no significant difference in flow rate and be free from quantitative inconsistency. By such a liquid feeding method, however, the experiment would end in a short period of time, and this is a disadvantage to an evaluation apparatus for scientific phenomena.

An object of the present invention, attempted in view of these circumstances, is to provide an evaluation apparatus for scientific phenomena which is inexpensive, imposes little load on the environment and is suitable for enabling its user to easily find fun in advanced technology, and an evaluation method for scientific phenomena using such an apparatus.

In order to achieve the object stated above, the invention provides an evaluation apparatus for scientific phenomena, comprising: a substrate of a planar shape in whose surface a plurality of long grooves having a cross-sectional area of not more than 1 $mm^2$ are formed, a plurality of liquid reservoirs formed in the substrate, the plurality of liquid reservoirs each of which has a vent and is 5 to 15000 $mm^3$ in capacity, and a cover plate which is disposed on the surface of the substrate in close contact therewith and enables a plurality of minute channels to be formed in the substrate by covering the long grooves, wherein one end of each of the plurality of the channels joins in at a single meeting point and the other end of each of the plurality of the channels communicates with one of the plurality of liquid reservoirs; when the substrate and cover plate are erected while keeping the substrate and cover plate in close contact with each other so that one or more of the plurality of liquid reservoirs are in a higher position over any other liquid reservoir and liquids are put into the liquid reservoirs, the liquids flow down in the channels and the state of the liquids flowing down the channels can be visually recognized.

In this evaluation apparatus according to the invention, a plurality of minute channels of 1 $mm^2$ or less in cross-sectional area are formed, and one end of each of these channels joins in at a single meeting point. When liquids are put into one or more of the liquid reservoirs in a higher position over any other liquid reservoir, the liquids flow down in the channels by gravity. Therefore, a scientific phenomenon, such as the diffusion of molecules, can be qualitatively observed. Furthermore, the apparatus provides a sufficient level of accuracy to enable the user to watch various phenomena involved in advanced technology, such as the diffusion of liquid, heat transfers by liquid, mixing of liquids and chemical reactions of liquid (including acid or alkali reaction and hydrolysis) in these minute channels, and uses no large quantity of chemicals or the like, which means little load on the environment Accordingly, such an evaluation apparatus for scientific phenomena is suitable for classroom use as a teaching aid in science experiments.

Particularly, since the feeding of liquid does not rely on the application of a positive or negative pressure using a pump or the like but relies only on gravity (the head difference of liquid), the apparatus has little room for a difference in individual skill levels to count, is simple in structure, inexpensive, easy to handle and moreover permits observation of a scientific phenomenon for a relatively long duration.

To add, it is preferable for the sectional area of the minute channels to be 1 $mm^2$ or less, more preferable to be 0.0025 to 0.64 $mm^2$ and the most preferable to be 0.01 to 0.25 $mm^2$.

The "liquid reservoirs" are usually hollow and, when this evaluation apparatus is to be operated, chemicals or the like are supplied into them.

According to the invention, there is also provided an evaluation apparatus for scientific phenomena, comprising: a substrate of a planar shape in whose surface a plurality of long grooves having a cross-sectional area of not more than 1 $mm^2$ are formed, a first liquid reservoir formed in the substrate, the first liquid reservoir having a vent and is 5 to 5000 $mm^3$ in capacity, a second liquid reservoir formed in the substrate, the second liquid reservoir having a vent and is 5 to 5000 $mm^3$ in capacity, a third liquid reservoir formed in the substrate, the third liquid reservoir having a vent and is 10 to 15000 $mm^3$ in capacity, and a cover plate which is disposed on the surface of the substrate in close contact therewith and enables a plurality of minute channels to be formed in the substrate by covering the long grooves, wherein one end of each of a first channel and a second channel, which are two of the channels substantially equal in length, joins the other at a single meeting point; the other end of the first channel communicates with the first liquid reservoir, the other end of the second channel communicates with the second liquid reservoir; one end of a third channel, which is one of the channels, communicates with the meeting point and the other end of the third channel communicates with the third liquid reservoir; when the substrate and cover plate are erected while keeping the substrate and cover plate in close contact with each other so that the first and the second liquid reservoirs are in a higher position over the third liquid reservoir, a first liquid is put into the first liquid reservoir, and a second liquid is put into the second liquid reservoir, the first liquid and second liquid flow down in the channels to the third liquid reservoir and the state of the first liquid and second liquid flowing down in the channels can be visually recognized.

In this evaluation apparatus according to the invention, three minute channels of 1 $mm^2$ or less in cross-sectional area are formed, one end of each of these channels joins in at a single meeting point. When the first liquid is put into the first liquid reservoir and the second liquid is put into the second liquid reservoir, the liquids flow down in the channels by gravity. Therefore, a scientific phenomenon, such as the diffusion of molecules, can be qualitatively observed. Furthermore, the apparatus provides a sufficient level of accuracy to enable the user to watch various phenomena involved in advanced technology, and uses no large quantity of chemicals or the like, which means little load on the environment. Accordingly, such an evaluation apparatus for scientific phenomena is suitable for classroom use as a teaching aid in science experiments.

Particularly, since the feeding of liquid does not rely on the application of a positive or negative pressure using a pump or the like but relies only on gravity (the head difference of liquid), the apparatus has little room for a difference in individual skill levels to count, is simple in structure, inexpensive, easy to handle and moreover permits observation of a scientific phenomenon for a relatively long duration.

In the present invention, it is preferable for the substrate and/or cover plate therein to be transparent. It is also preferable for the substrate and/or cover plate to be made of a resin material. Where the substrate and/or cover plate is transparent, the scientific phenomenon in the channels can be visually recognized, and the substrate and/or cover plate made of a resin material would make the evaluation apparatus available at a lower price.

It is further preferable in the present invention one or more of the liquid reservoirs to be provided with detachable sealing devices. Liquid reservoirs provided with detachable sealing devices would facilitate various experiments because, when liquid reservoirs are filled with liquids before the start of experiment, if these liquids flow down in the channels by gravity, it will be difficult to control the timing of the start of experiment, but by equipping the liquid reservoirs with detachable sealing devices, premature flowing down of the liquids can be prevented, and removal of the detachable sealing devices from the liquid reservoirs can let the liquids start flowing down.

It is also preferable in the present invention for the channels to be filled with a dummy liquid. Filling of the channels with a dummy liquid makes it possible to effectively prevent bubbles or the like from coming into the test liquids when they are dropped in. Furthermore, since the sectional areas of the channels are small, the effect of surface tension occurring between the inner walls of the channels and the dummy liquid prevents the dummy liquid from flowing down inside the channels.

According to the invention, there is further provided an evaluation method for scientific phenomena using the evaluation apparatus for scientific phenomena described above, comprising the steps of: erecting the first liquid reservoir and second liquid reservoir so that the vents thereof be directed upward in a state in which the substrate and the cover plate are kept in close contact with each other; sealing the third liquid reservoir with the sealing device; putting the first liquid into the first liquid reservoir; putting the second liquid into the second liquid reservoir; and flowing the first liquid and second liquids down the channels by removing the sealing device from the third liquid reservoir and opening the inside of the third liquid reservoir to atmospheric pressure, thereby enabling the state in which the first liquid and the second liquid flow down to be visually recognized.

According to the invention, the third liquid reservoir is sealed with the sealing device, then liquids are put into the first liquid reservoir and the second liquid reservoir, and after that the liquids are allowed to flow down the channels by removing the sealing device from the third liquid reservoir and opening the inside of the third liquid reservoir to atmospheric pressure. Therefore, the timing of the start of experiment can be easily controlled.

Incidentally, being "erected" in a state in which the substrate and the cover plate are kept in close contact with each other in its general sense means keeping the substrate and the cover plate in a substantially vertical state, the concept in the context of the invention also includes a state in which the substrate and the cover plate are kept inclined at a prescribed angle from the vertical axis. The reason is that, even in such a state, when liquids are put into the liquid reservoirs, gravity performs the role of causing the liquids to flow down the channels.

The scientific phenomena in this context refer to various chemical phenomena and physical phenomena of liquid occurring in the minute channels, and include the diffusion of liquid, heat transfers by liquid, mixing of liquids and chemical reactions of liquid (including acid or alkali reaction and hydrolysis).

As described above, in the evaluation apparatus according to the present invention, there are formed a plurality of minute channels of 1 mm$^2$ or less in cross-sectional area, one end of each of these channels joins in at a single meeting point and, when liquids are put into one or more of the liquid reservoirs in a higher position over any other liquid reservoir, the liquids flow down in the channels by gravity. Therefore, a scientific phenomenon, such as the diffusion of molecules, can be qualitatively observed. Furthermore, the apparatus provides a sufficient level of accuracy to enable the user to watch various phenomena involved in advanced technology, and uses no large quantity of chemicals or the like, which means little load on the environment.

DETAILED DESCRIPTION OF THE PREFERRED EMBODIMENTS

Figure 1:
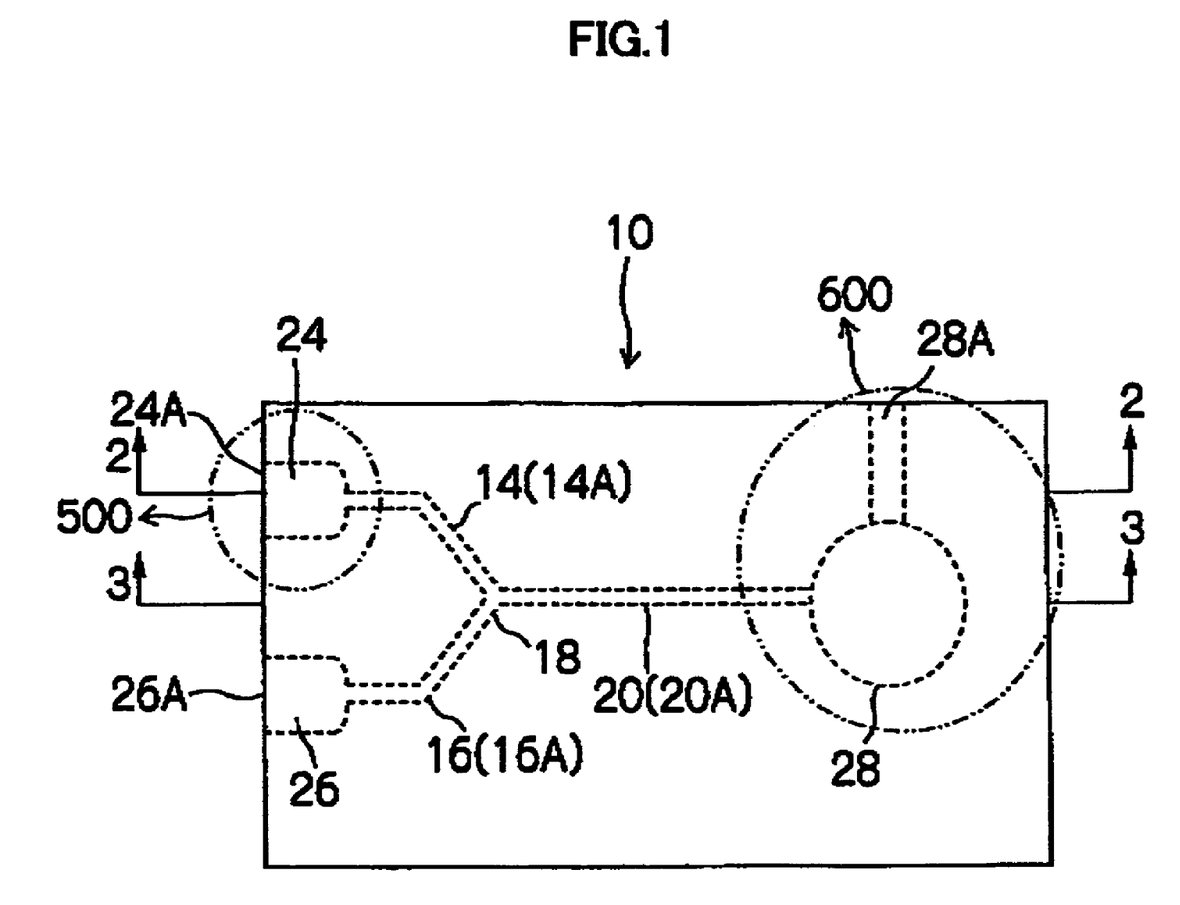
FIG. 1 is a plan illustrating the configuration of an evaluation apparatus for scientific phenomena according to the present invention.
Figure 2:
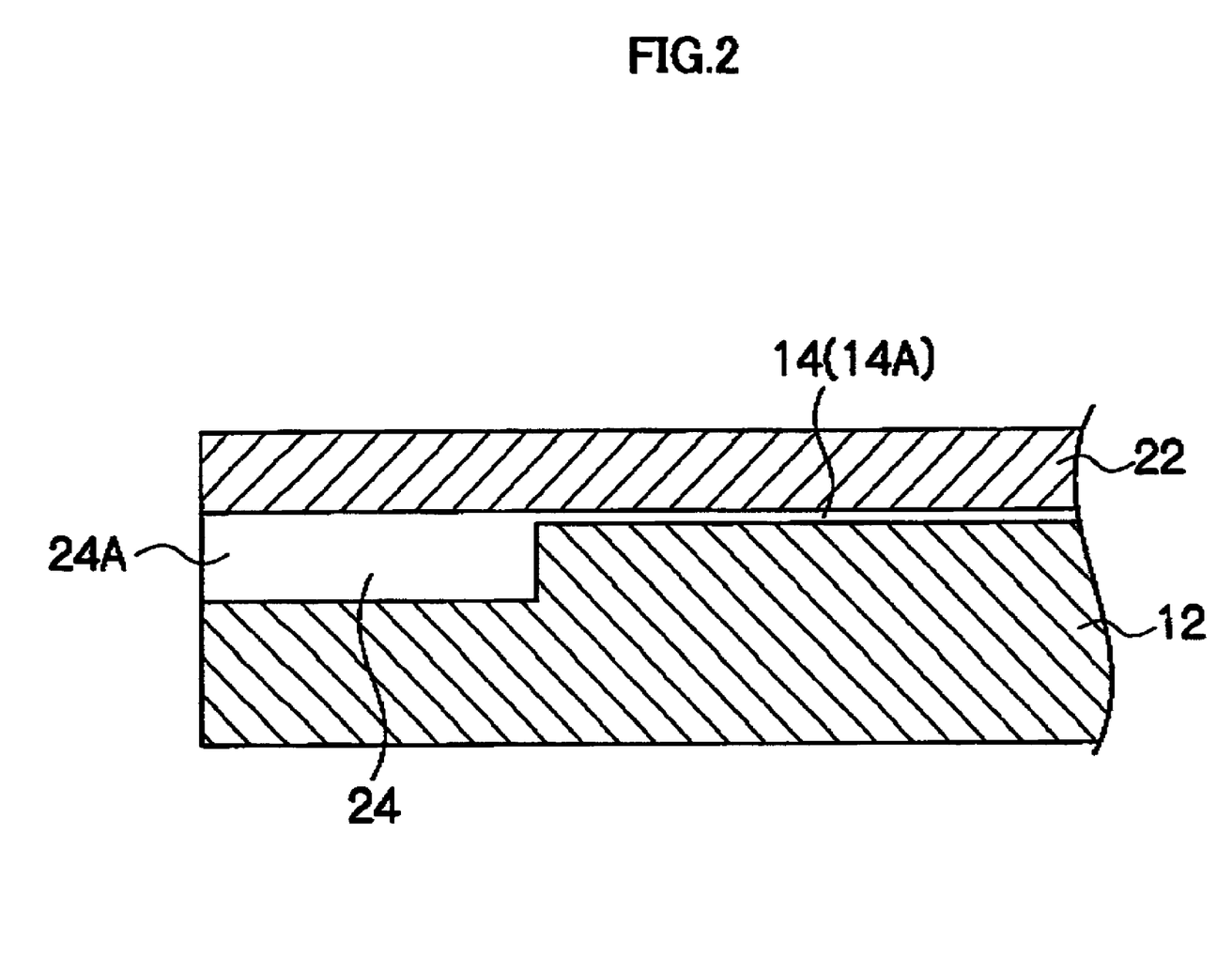
FIG. 2 shows a partially expanded sectional view along line 2-2 of the portion contained in dotted circle 500 of FIG. 1.
Figure 3:
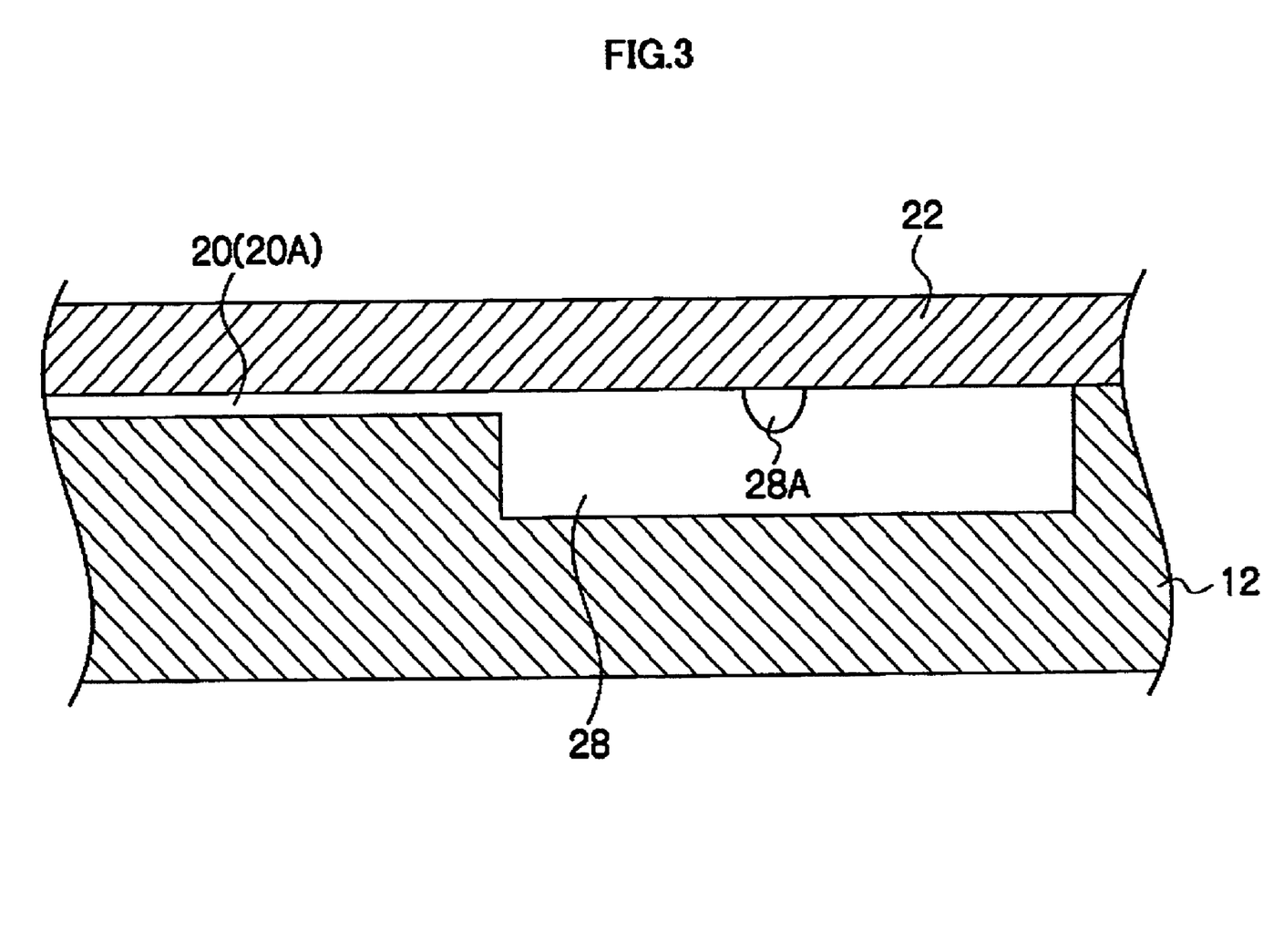
FIG. 3 shows a partially expanded sectional view along line 3-3 of the portion contained in dotted circle 600 of FIG. 1.

A preferred embodiment (first embodiment) of the present invention, which elates to an evaluation apparatus for scientific phenomena and an evaluation method for scientific phenomena using the apparatus, will be described below with reference to the accompanying drawings. FIG. 1 is a plan illustrating the configuration of an evaluation apparatus for scientific phenomena according to the invention, which is a science experiment teaching aid 10. FIG. 2 and FIG. 3 show partially expanded sectional views of FIG. 1, FIG. 2 showing the vicinities of a first liquid reservoir 24 (the part surrounded by a dotted circle in the upper left of FIG. 1) and FIG. 3, the vicinities of a third liquid reservoir 28 (the part surrounded by a dotted circle in the lower right of FIG. 1).

Thus, the science experiment teaching aid 10 comprises a substrate 12 of a planar shape in whose surface long grooves (14, 16 and 20) of 1 mm$^2$ or less in sectional area are formed, and a transparent cover plate 22 which is disposed on the surface of this substrate 12 in close contact with it and enables minute channels (14A, 16A and 20A) to be formed in the substrate 12 by covering the long grooves.

The minute channels formed by the long grooves (14, 16 and 20) comprise a first channel 14A and a second channel 16A, which are approximately as long and join at a meeting point 18, and a third channel 20A which further joins the first channel 14A and second channel 16A at the meeting point 18.

The other end of the first channel 14A communicates with a first liquid reservoir 24, which is a half-columnar hollow formed in the substrate 12; the other end of the second channel 16A communicates with a second liquid reservoir 26, which is another half-columnar hollow formed in the substrate 12; and the other end of the third channel 20A communicates with a third liquid reservoir 28, which is still another half-columnar hollow formed in the substrate 12.

As the first liquid reservoir 24 and the second liquid reservoir 26 are formed near an end of the substrate 12 (near its left short side), they respectively have vents 24A and 26A.

Although the third liquid reservoir 28 is formed in the right part of the substrate 12 and constitutes a sealed space, a long groove 28A, whose section communicating with an end (the upper long side) of the substrate 12 has a semicircular section, is formed in the substrate 12, and this long groove 28A constitutes a through hole and accordingly the vent of the third liquid reservoir 28.

It is preferable for the capacities of the first liquid reservoir 24 and the second liquid reservoir 26 to be 5 to 5000 m$^3$, and that of the third liquid reservoir 28 to be 10 to 15000 mm$^3$. This choice of capacities facilitates control of phenomena taking place in the microscopic channels.

The planar sizes of the substrate 12 and the cover plate 22, though there is no particular restriction, may be 80×50 mm for instance, in view of the character of the science experiment teaching aid 10 intended for classroom use. The thicknesses of the substrate 12 and the cover plate 22, though there is no particular restriction either, may be for example about 5 mm for both in view of their strength, economy and other factors.

The material of the substrate 12, though there is no particular restriction either, should preferably be a resin with a view to facilitating its manufacture, the method of which win be described afterwards. More specifically, the preferable choice of materials includes polydimethyl sulfoxide (PDMS), polymethyl methacrylate (PMMA), polyvinyl chloride (PVC), ultraviolet ray-setting resin and polycarbonate (PC).

It is preferable for the sectional area of the long grooves (14, 16 and 20) to be formed in the surface of the substrate 12 to be not more than 1 mm$^2$ as stated above, more preferable to be 0.0025 to 0.64 mm$^2$, and the most preferable to be 0.01 to 0.25 mm$^2$. Sectional shapes that can be preferred for these long grooves (14, 16 and 20) may be rectangular (square or oblong), trapezoidal, V, semicircular or the like, but a rectangular (square or oblong) shape is the most preferable because of the ease of manufacturing process to be described afterwards.

The material of the cover plate 22, though there is no particular restriction, should preferably be transparent to make the scientific phenomena in the channels visually recognizable. Such materials include various resin plates, more specifically, polydimethyl sulfoxide (PDMS), polymethyl methacrylate (PMMA), polyvinyl chloride (PVC), ultraviolet ray-setting resin and polycarbonate (PC) plates, various resin films, more specifically, polyethylene terephthalate (PET), polyethylene naphthalate (PEN) and triacetyl cellulose (TAC) films, and some kinds of glass (soda lime glass, borosilicate glass and so forth).

The usual choice for this the cover plate 22 would be a plate of which both surfaces are flat, but it is also acceptable to form its parts corresponding to the minute channels (14A, 16A and 20A) into convex lenses to enable the user to observe the contents in an expanded view.

Incidentally, it is also conceivable to use a configuration in which the cover plate 22 is opaque and the substrate 12 is transparent.

It is preferable for the front surface (on the surface in which long grooves are formed) of the substrate 12 and the rear surface (the surface to be in close contact with the substrate 12) of the cover plate 22 to be sufficiently flat for the formation of the minute channels (14A, 16A and 20A) and to prevent liquid leaks among other aspects.

Next will be described the method of forming the substrate 12. First, an inverted face mold on which the inverted shape of the long grooves (14, 16 and 20) of the substrate 12 is formed on the surface is made ready. On the surface of this inverted face mold, it is also necessary to form the inverted shape of the first liquid reservoir 24, the second liquid reservoir 26, the third liquid reservoir 28 and the long groove 28A. This inverted face mold can be fabricated by machining with a machining center, electric discharging, ultrasonic processing, photo-etching or any other suitable known process.

Next, the surface of this inverted face mold is coated with a parting agent. Any suitable material can be chosen as this parting agent according to the type of resin used for the substrate 12 and its processing conditions (including the temperature) among other factors.

Then, the surface of the inverted face mold is coated with a resin material, which is then hardened. Where this resin is an ultraviolet ray-setting resin for instance, it is hardened by irradiating the resin coat with ultraviolet rays. Or where it is a thermosetting resins, such as polyvinyl chloride (PVC), the resin is kept in contact with the surface of the inverted face mold, and the pattern is thermally transferred with a hot press.

The hardened resin is then peeled off the inverted face mold.

This method enables the long grooves to be accurately formed at low cost, and thereby to reduce the cost of the evaluation apparatus.

Next will be described the method of using the science experiment teaching aid 10 according to the invention. The science experiment teaching aid 10 should be available as a set of the following items 1) through 10).

1) Inverted face mold
2) Resin for the substrate 12
3) Mold for forming the substrate 12
(To be used as the mold when the resin is to be poured to form the substrate 12.)
4) Cover plate 22
5) Pipette for feeding sample liquids
(To be used for dropping necessary sample liquids (reagents) according to the purpose of test into the first liquid reservoir 24 and the second liquid reservoir 26. Either a pipette for exclusive use with each type of chemical may be provided or a common single pipette may be washed after each time of use with a different chemical.)
6) Sealing tape (sealing device)
(This serves to seal the third liquid reservoir. It is intended to lid the vent of the long groove 28A and thereby to seal the third liquid reservoir 28 before dropping the sample liquids with a pipette into the first liquid reservoir 24 and the second liquid reservoir 26.)

7) Casing
(This casing is fitted, when the experiment set has been assembled, to prevent liquid leaks from between the cover plate 22 and the substrate 12 or any damage to the cover plate 22. Incidentally, it is also possible to equip this casing with various functions to serve the purpose of experiment, such as a magnifying lens to facilitate observation of the channels.)
8) Sample liquids (reagents) for testing
(Necessary chemicals that can serve as test reagents for science tests are supplied, each contained in a reagent vessel. The sample liquids include coloring liquids, typically coloring agents or pigments, and transparent liquids, typically water.)
9) Test manual
(A manual containing information on events that can be learned with the aid of this set, such as the purpose of experiment, explanation of the phenomenon and applications, may be appended as required.)
10) Brochure on experiment procedure Incidentally, though this set is intended to have each pupil make the substrate 12 on a do-it-yourself basis, where the making of this substrate 12 is to be dispensed with, a finished substrate 12 may be included in the set in place of items 1) through 3).

Figure 4:
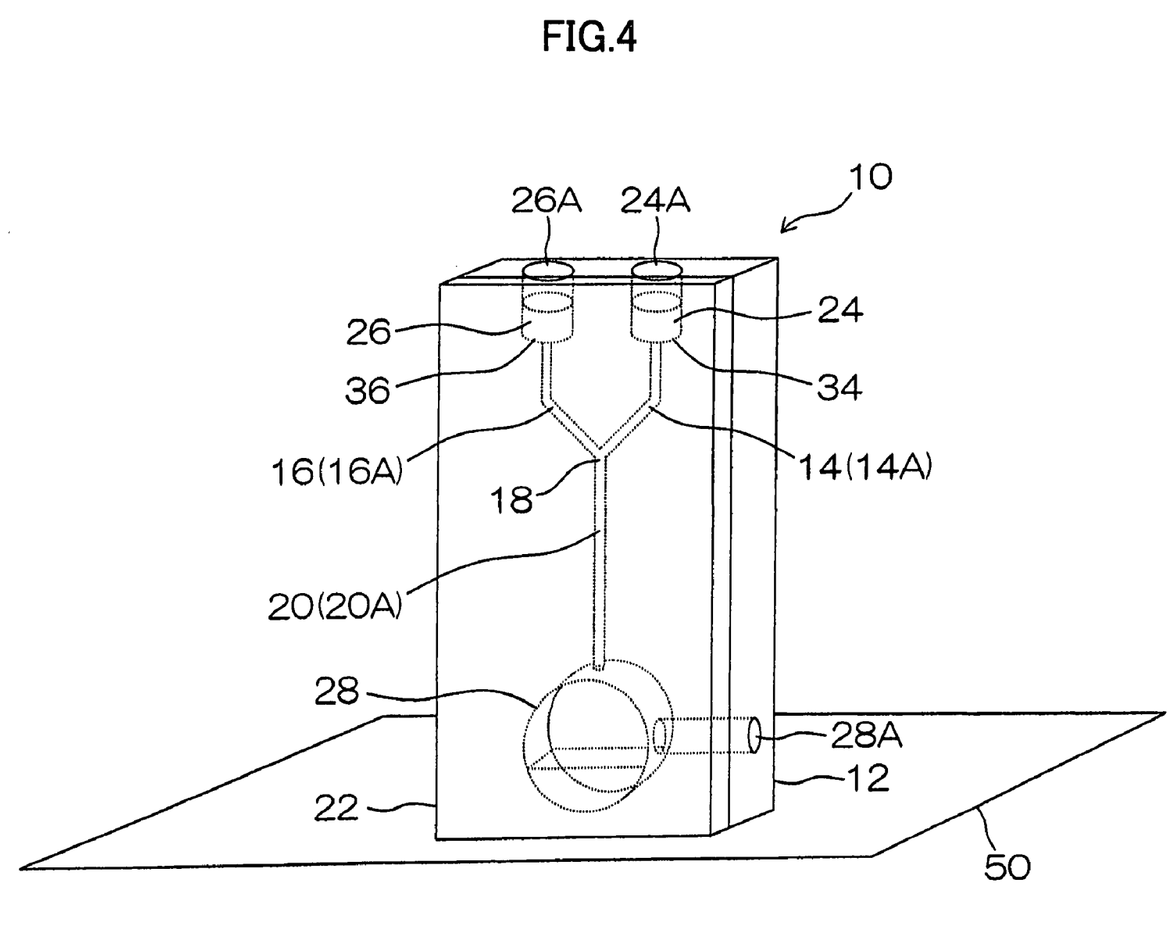
FIG. 4 is a perspective view illustrating an experiment method.

Details of an experiment using this set will be described in detail below. FIG. 4, illustrating an experiment method, is a perspective view of the science experiment teaching aid 10. Incidentally, the casing of this experiment set is not illustrated.

First, the science experiment teaching aid 10 is placed on a test table 50 with the respective vents 24A and 26A of the first liquid reservoir 24 and the second liquid reservoir 26 pointing upward. It is preferable then to use in combination an anti-falling member (not shown) that can prevent the science experiment teaching aid 10 from falling. It is also preferable to provide the casing of this science experiment teaching aid with an anti-falling function.

Next, the vent of the long grooves 28A is lidded (not shown) with the sealing tape for the science experiment teaching aid to seal the third liquid reservoir 28.

Then, a first liquid 34 is dropped into the first liquid reservoir 24, and a second liquid 36 into the second liquid reservoir 26, by using the sample liquid-dropping pipette of this science experiment teaching aid. As these first liquid 34 and second liquid 36, necessary sample liquids (reagents) for the purpose of the given test are selected. Incidentally, as the third liquid reservoir 28 is sealed in this state, none of the first liquid 34 and the second liquid 36 is flowing down.

The experiment starts with peeling off the sealing tape, which lids the vent of the long groove 28A, of this science experiment teaching aid. The resultant unsealing of the third liquid reservoir 28 opens the inside of the third liquid reservoir 28 to atmospheric pressure. As a result, the first liquid 34 in the first liquid reservoir 24 begins to flow down the first channel 14A, as does the second liquid 36 in the second liquid reservoir 26 begin to flow down the second channel 16A, the first liquid 34 and the second liquid 36 join at the meeting point 18, and they flow down in the third channel 20A to accumulate in the third liquid reservoir 28. FIG. 4 illustrates this state.

In this process, the states of the first liquid 34 flowing down the first channel 14A, the second liquid 36 flowing down the second channel 16A, the first liquid 34 and the second liquid 36 meeting each other at the meeting point 18, and the joined first liquid 34 and second liquid 36 flowing down in the third channel 20A can be visually recognized.

In the procedure described so far, the first liquid 34 and the second liquid 36 which are sample liquids accumulate in the third liquid reservoir 28 as shown in FIG. 4. When the first liquid reservoir 24 has run out of the first liquid 34 or the second liquid reservoir 26 has run out of the second liquid 36, the experiment ends. In this process, the pupils can observe how the sample liquids, i.e. the first liquid 34 and the second liquid 36 join at the meeting point 18.

The duration of the experiment from start to end (when the first liquid reservoir 24 runs out of the first liquid 34 or the second liquid reservoir 26 runs out the second liquid 36) is relatively long, and in this process the pupils can observe the scientific phenomenon for a considerably long time without having to perform any manipulation.

Especially by differentiating in color the sample liquids, i.e. the first liquid 34 and the second liquid 36 to be fed to the first liquid reservoir 24 and the second liquid reservoir 26, respectively, the meeting of the first liquid 34 and the second liquid 36 at the meeting point 18 can be made more vividly recognizable. For instance, a colored first liquid 34 can be fed to the first liquid reservoir 24 and a colorless transparent second liquid 36 can be fed to the second liquid reservoir 26.

By observing the flow in the third channel 20A from and after the meeting point 18 where the first liquid 34 and the second liquid 36 join in this way, the experiment team can confirm the phenomenon of the diffusion of coloring molecules, which may be coloring agents or pigments, from the coloring liquid side, flowing in the microchannel, into the transparent liquid.

Further, by differentiating in not only color but also viscosity, the first liquid 34 and the second liquid 36 to be fed to the first liquid reservoir 24 and the second liquid reservoir 26, respectively, the team can observe better how the first liquid 34 and the second liquid 36 join at the meeting point 18.

Incidentally, for even better observation of these phenomena, a magnifying glass of one kind or another can be used as well. Incidentally, it is also possible to equip, as stated above, the part of the third channel 20A matching the cover plate 22 with the function of a magnifying glass (lens function).

The science experiment teaching aid 10 so far described makes it possible to perform such experiments at low cost and yet with high accuracy by simplifying essential parts as much as possible so that children can experience exciting dreams through science experiments in a microscopic world.

Especially when diffusion of molecules, which constitutes the very basis of chemical reactions, is to be observed qualitatively, it is imperative in order to enhance the accuracy of the experiment that a plurality of liquids flow in channels at least under the same conditions, and this apparatus can well meet this requirement. Thus, relatively accurate experiments can be performed with very simple and inexpensive device. Since it is used for experiments in a microscopic world, the dose of chemicals, typically coloring agents or pigments, can be kept to the minimum, with a significant alleviation of the environmental load.

Next, a second embodiment of the present invention will be described with reference to FIG. 5. Incidentally, the members having exact or close counterparts in the first embodiment will be assigned respectively the same reference characters, and their description will be dispensed with.

In this embodiment, unlike in the first embodiment the channels (14A, 16A and 20A) are filled with a dummy liquid 38 in advance of the start of the experiment. This filling of the channels (14A, 16A and 20A) with the dummy liquid 38 can effectively prevent bubbles or the like from coming into the test liquids when they are dropped in.

Since the sectional areas of the channels (14A, 16A and 20A) are small, the effect of surface tension occurring between the inner walls of the channels (14A, 16A and 20A) and the dummy liquid 38 prevents the dummy liquid 38 from flowing down from inside the channels (14A, 16A and 20A).

Next will be described the procedure of filling the channels (14A, 16A and 20A) with the dummy liquid 38. First, by using the sample liquid-dropping pipette of this science experiment teaching aid, the dummy liquid 38 is dropped into the first liquid reservoir 24 and the second liquid reservoir 26.

In this procedure, it is conceivable, before putting the liquid in, to lid the vent of the long groove 28A with the sealing tape of this science experiment teaching aid to seal the third liquid reservoir 28 as in the first embodiment, or it is also acceptable not to seal the third liquid reservoir 28. The reason is that, since there is only one kind of dummy liquid 38, whether the dummy liquid 38 is first dropped into the first channel 14A or into the second channel 16A makes no difference in filing them with the dummy liquid 38.

By putting the dummy liquid 38 into the first liquid reservoir 24 and the second liquid reservoir 26 (further by peeling the sealing tape off the vent of the long groove 28A), the dummy liquid 38 is caused to accumulate in the third liquid reservoir 28 via the first channel 14A and the second channel 16A, and then the third channel 20A.

Then, after confirming that the channels (14A, 16A and 20A) are filled with the dummy liquid 38 and there is no bubble or the like therein, the science experiment teaching aid 10 is inclined to discharge the dummy liquid 38 having accumulated in the first liquid reservoir 24, the second liquid reservoir 26 and the third liquid reservoir 28.

Figure 5:
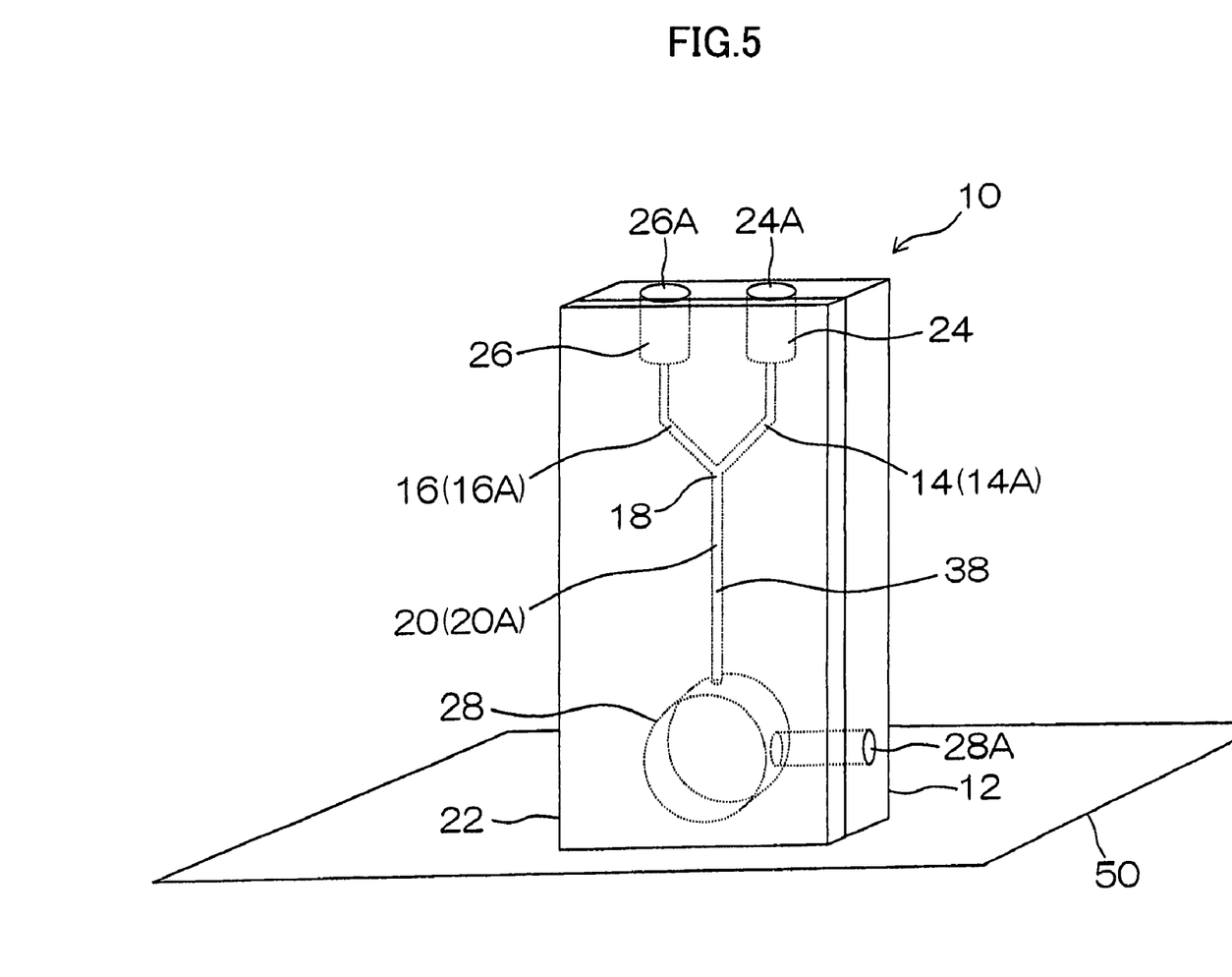
FIG. 5 is a perspective view illustrating a second embodiment of the invention.

In this way, there is achieved a state in which the channels (14A, 16A and 20A) are filled with the dummy liquid 38 in advance of the start of the experiment as shown in FIG. 5.

To add, as stated above, since the sectional areas of the channels (14A, 16A and 20A) are small, the effect of surface tension occurring between the inner walls of the channels (14A, 16A and 20A) and the dummy liquid 38 prevents the dummy liquid 38 from flowing down from inside the channels (14A, 16A and 20A).

As the rest of the procedure of the experiment is the same as in the first embodiment, its description will be dispensed with. Since the channels (14A, 16A and 20A) are filled with the dummy liquid 38, infiltration of bubbles or the like can be effectively prevented when the test liquids (the first liquid 34 and the second liquid 36) flow in.

The dummy liquid 38 for this embodiment can be chosen out of a wide variety of liquids with no particular restriction, including distilled water and pure water for instance. It is also preferable to color the dummy liquid 38 so that the filling of the channels (14A, 16A and 20A) with the dummy liquid 38 can be visually recognized. When it is to be colored, it is preferable to color the dummy liquid 38 differently from the test liquids (the first liquid 34 and the second liquid 36).

When the kit is to remain idle for a long period from the pre-experiment state shown in FIG. 5 until the start of the experiment, for instance where the science experiment teaching aid 10 is marketed in a state in which its channels (14A, 16A and 20A) are filled with the dummy liquid 38, it is preferable to lid the vents 24A and 26A and the vent of the long groove 28A with sealing tapes to prevent the dummy liquid 38 from evaporating.

Figure 6:
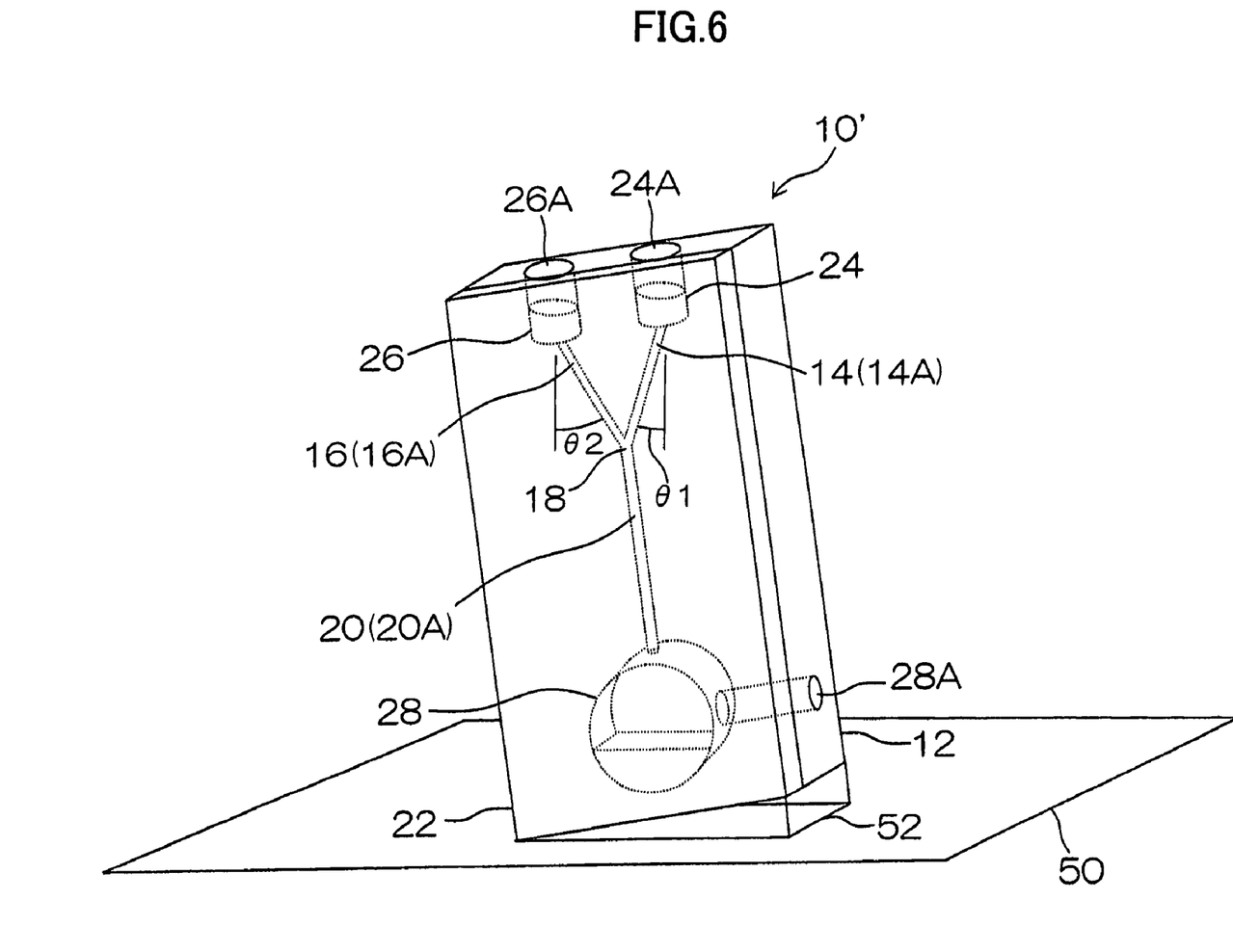
FIG. 6 is a perspective view illustrating a third embodiment of the invention.

Next, a third embodiment of the present invention will be described with reference to FIG. 6. Incidentally, the members having exact or close counterparts in the first embodiment described above will be assigned respectively the same reference numerals, and their description will be dispensed with.

In this embodiment, unlike in the first embodiment, the first channel 14A and the second channel 16A are linearly formed, and the channels (14A, 16A and 20A) altogether constitute an Y shape. In addition, a wedge-shaped base 52 is inserted underneath the science experiment teaching aid 10 so as to incline it leftward in an erected state.

Because of this configuration, the angle of inclination θ1 of the first channel 14A relative to the vertical axis differs from the angle of inclination θ2 of the second channel 16A relative to the vertical axis. This arrangement enables the flow rate ratio between the first liquid 34 flowing in the first channel 14A and the second liquid 36 flowing in the second channel 16A to be controlled.

As the rest of the procedure of the experiment is the same as in the first embodiment, its description will be dispensed with.

Whereas the evaluation apparatus for scientific phenomena and an evaluation method for scientific phenomena using the apparatus according to the present invention have been hitherto described with reference to embodiments thereof, the invention is not limited to these embodiments, but can be implemented in various other ways.

For instance, these embodiments are teaching aids in which two kinds of sample liquids (the first liquid 34 and the second liquid 36) join at the meeting point 18 and which enable the phenomenon of coloring molecules, typically coloring agents or pigents, diffusing into a transparent liquid to be observed, the invention can also be applied to many kinds of teaching aid experiments.

Also, these embodiments have a configuration of three each of channels and liquid reservoirs, a configuration having four or more each is also conceivable.

While the science experiment teaching aid 10 is perpendicularly erected in the first and second embodiments and inclined leftward in the third embodiment, it can as well be erected in other ways. For instance, the science experiment teaching aid 10 may be leaned forward or backward. The point is that the users should be able to visually observe how the sample liquids are let flow down by the action of gravity.

Further, although a liquid-dropping pipette is used to feed sample liquids (reagents) to the liquid reservoirs (24 and 26) in the foregoing embodiments, a syringe or a microsyringe having the same function can be used instead. As a science experiment teaching aid for classroom use, generally a less expensive pipette is more desirable, but alternatives with the same function may be more preferable depending on the purpose of test.

What is claimed is:

1. An evaluation apparatus for scientific phenomena, comprising:
a substrate of a planar shape in whose surface a plurality of long grooves having a cross-sectional area of not more than 1 mm$^2$ are formed;
a plurality of liquid reservoirs formed in the substrate, the plurality of liquid reservoirs each of which has a vent and is 5 to 15000 mm$^3$ in capacity; and
a cover plate which is disposed on the surface of the substrate in close contact therewith and enables a plurality of minute channels to be formed in the substrate by covering the long grooves, wherein:
one end of each of the plurality of the channels joins in at a single meeting point and the other end of each of the plurality of the channels communicates with one of the plurality of liquid reservoirs; and
when the substrate and cover plate are erected while keeping the substrate and cover plate in close contact with each other so that one or more of the plurality of liquid reservoirs are in a higher position over any other liquid reservoir and liquids are put into the liquid reservoirs in said higher position such that the liquids flow down the channels and the state of the liquids flowing down the channels can be visually recognized.

2. The evaluation apparatus for scientific phenomena according to claim 1, wherein the substrate and/or the cover plate is transparent.

3. The evaluation apparatus for scientific phenomena according to claim 2, wherein the substrate and/or cover plate is made of a resin material.

4. The evaluation apparatus for scientific phenomena according to claim 3, wherein one or more of the liquid reservoirs are provided with detachable sealing devices.

5. The evaluation apparatus for scientific phenomena according to claim 4, wherein the channels are filled with a dummy liquid.

6. An evaluation method for scientific phenomena using the evaluation apparatus for scientific phenomena of claim 4, comprising the steps of:
erecting the substrate and cover plate while keeping the substrate and cover plate in close contact with each other so that the vents of the first liquid reservoir and second liquid reservoir are directed upward;
sealing the third liquid reservoir with the sealing device;
putting the first liquid into the first liquid reservoir;
putting the second liquid into the second liquid reservoir; and
flowing the first liquid and second liquid down the channels by removing the sealing device from the third liquid reservoir and opening the inside of the third liquid reservoir to atmospheric pressure, thereby enabling the state in which the first liquid and the second liquid flow down to be visually recognized.

7. The evaluation apparatus for scientific phenomena according to claim 1, wherein the substrate and/or cover plate is made of a resin material.

8. The evaluation apparatus for scientific phenomena according to claim 1, wherein one or more of the liquid reservoirs are provided with detachable sealing devices.

9. An evaluation method for scientific phenomena using the evaluation apparatus for scientific phenomena of claim 8, comprising the steps of:
erecting the substrate and cover plate while keeping the substrate and cover plate in close contact with each other so that the vents of the first liquid reservoir and the second liquid reservoir are directed upward;
sealing the third liquid reservoir with the sealing device;
putting the first liquid into the first liquid reservoir;
putting the second liquid into the second liquid reservoir; and
flowing the first liquid and second liquids down the channels by removing the sealing device from the third liquid reservoir and opening the inside of the third liquid reservoir to atmospheric pressure, thereby enabling the state in which the first liquid and the second liquid flow down to be visually recognized.

10. The evaluation apparatus for scientific phenomena according to claim 1, wherein the channels are filled with a dummy liquid.

11. An evaluation apparatus for scientific phenomena, comprising:
- a substrate of a planar shape in whose surface a plurality of long grooves having a cross-sectional area of not more than 1 mm2 are formed;
- a first liquid reservoir formed in the substrate, the first liquid reservoir having a vent and is 5 to 5000 mm$^3$ in capacity;
- a second liquid reservoir formed in the substrate, the second liquid reservoir having a vent and is 5 to 5000 mm$^3$ in capacity;
- a third liquid reservoir formed in the substrate, the third liquid reservoir having a vent and is 10 to 15000 mm$^3$ in capacity; and
- a cover plate which is disposed on the surface of the substrate in close contact therewith and enables a plurality of minute channels to be formed in the substrate by covering the long grooves, wherein:
- one end of each of a first channel and a second channel, which are two channels substantially equal in length, joins the other at a single meeting point;
- the other end of the first channel communicates with the first liquid reservoir;
- the other end of the second channel communicates with the second liquid reservoir;
- one end of a third channel, which is one of the channels, communicates with the meeting point and the other end of the third channel communicates with the third liquid reservoir; and
- when the substrate and cover plate are erected while keeping the substrate and cover plate in close contact with each other so that the first and the second liquid reservoirs are in a higher position over the third liquid reservoir, a first liquid is put into the first liquid reservoir, and a second liquid is put into the second liquid reservoir, the first liquid and second liquid flow down in the channels to the third liquid reservoir and the state of the first liquid and second liquid flowing down in the channels can be visually recognized.

12. The evaluation apparatus for scientific phenomena according to claim 11, wherein the substrate and/or the cover plate is transparent.

13. The evaluation apparatus for scientific phenomena according to claim 12, wherein the substrate and/or cover plate is made of a resin material.

14. The evaluation apparatus for scientific phenomena according to claim 13, wherein one or more of the liquid reservoirs are provided with detachable sealing devices.

15. The evaluation apparatus for scientific phenomena according to claim 14, wherein the channels are filled with a dummy liquid.

16. An evaluation method for scientific phenomena using the evaluation apparatus for scientific phenomena of claim 14, comprising the steps of:
- erecting the substrate and cover plate while keeping the substrate and cover plate in close contact with each other so that the vents of the first liquid reservoir and second liquid reservoir are directed upward;
- sealing the third liquid reservoir with the sealing device;
- putting the first liquid into the first liquid reservoir;
- putting the second liquid into the second liquid reservoir; and
- flowing the first liquid and second liquid down the channels by removing the sealing device from the third liquid reservoir and opening the inside of the third liquid reservoir to atmospheric pressure, thereby enabling the state in which the first liquid and the second liquid flow down to be visually recognized.

* * * * *